2,756,778

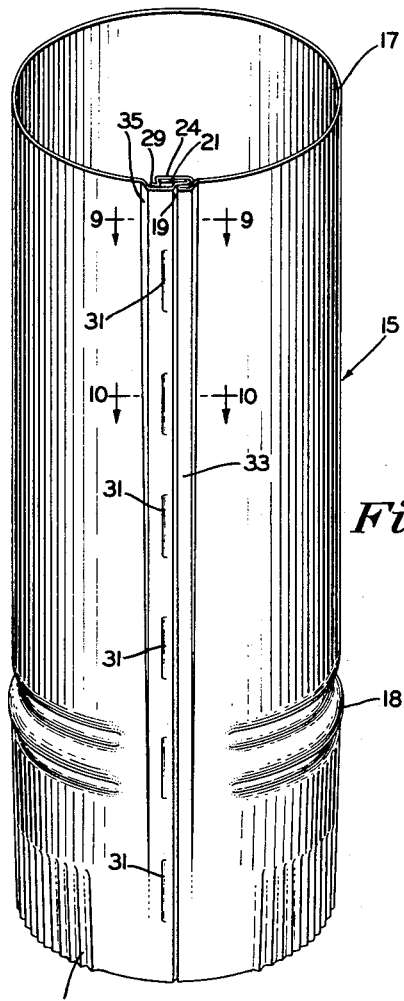
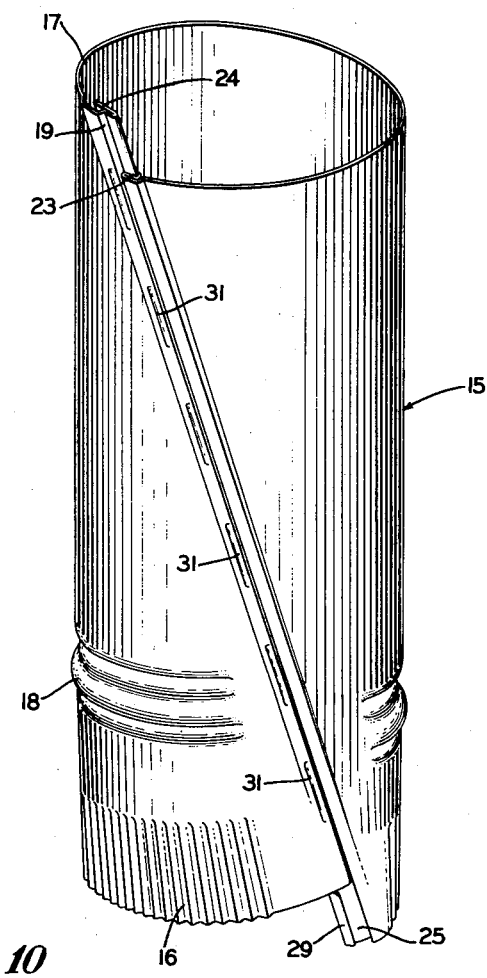
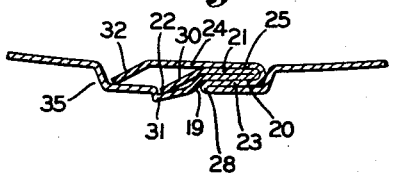
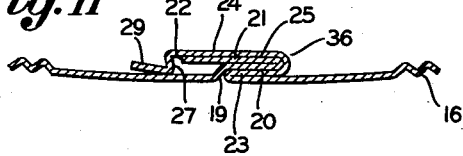
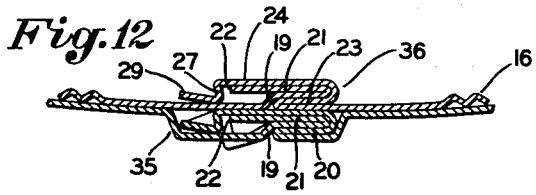

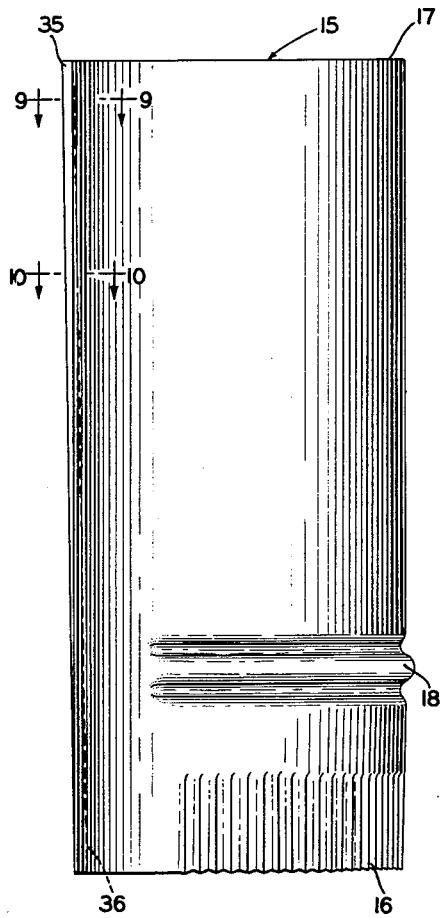
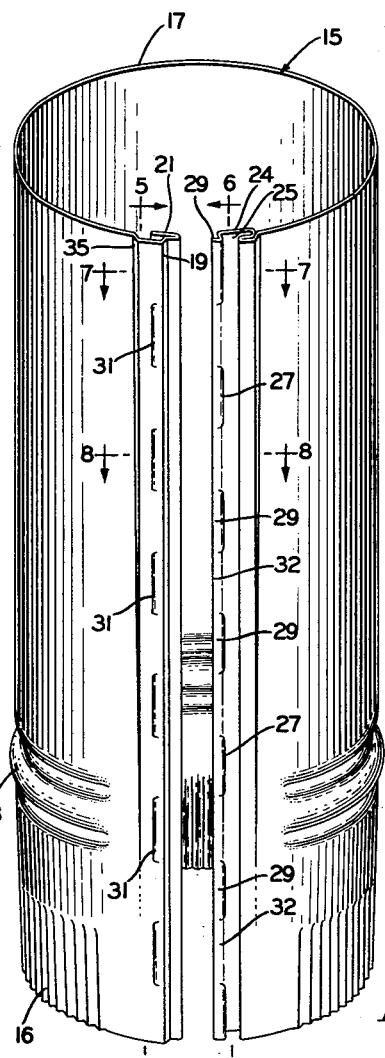
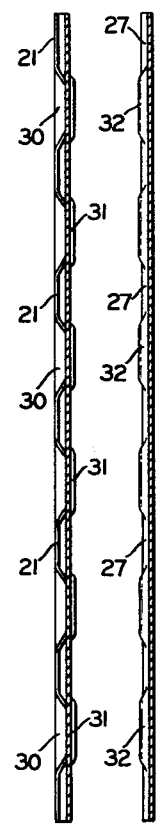
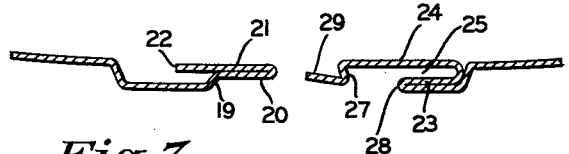
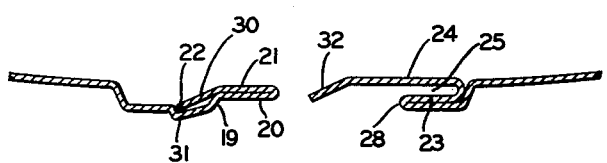
July 31, 1956 — R. G. CURTIS — 2,756,778
INTERRUPTED LOCK JOINT FOR METAL PIPES
Filed July 6, 1954 — 2 Sheets-Sheet 2
Fig. 4  Fig. 3  Fig. 5  Fig. 6
Fig. 7
Fig. 8
INVENTOR.
Rowland G. Curtis
BY Frease & Bishop
ATTORNEYS

United States Patent Office 2,756,778
Patented July 31, 1956

INTERRUPTED LOCK JOINT FOR METAL PIPES

Rowland G. Curtis, Dover, Ohio, assignor to Reeves Steel and Manufacturing Company, Dover, Ohio, a corporation of Ohio Application July 6, 1954, Serial No. 441,457

5 Claims. (Cl. 138—74)

The invention relates to lock joints for sheet metal pipes, and the present application is a continuation in part of my co-pending application, Serial No. 340,756, filed March 6, 1953, now Patent No. 2,703,110.

The improved lock joint is applicable to pipes of round, oval, square or rectangular cross section, and while it is especially adapted for use upon the class of sheet metal pipes commonly called stove pipes, it is also applicable to furnace pipes, ducts, conductor pipes and other sheet metal pipes having interlocking formations upon opposed edges of the pipe sections whereby the edges of the pipe can be quickly and easily locked together without the use of tools.

Examples of the general type of lock joint to which the invention is applicable are disclosed in Krantz Reissue Patent No. Re. 18,444, dated April 26, 1932, Sladky Patent No. 1,900,749, dated March 7, 1933, and Krantz Patent No. 1,900,750, dated March 7, 1933.

The above patents are merely examples of a number of interlocking pipe joints of the general type referred to, and although the improvement constituting the present invention is applicable to this class of lock joints generally, for the purpose of illustration only it is disclosed herein as applied to a lock joint of the specific character shown in Krantz Patent No. 1,900,750.

Such pipe joints are designed for the purpose of securely locking the opposed edges of a pipe section together, and because of the construction of the interlocking formations upon the opposed edges of the pipe sections, it is frequently quite difficult to disengage these locking formations so that the pipe sections may be opened up.

There are certain cases, such as in military camps and the like, where it is sometimes desirable to disassemble or knock down stove pipes and the like so that they may be nested together for transportation to a different location where the pipe sections are again assembled and placed in use.

Lock joints of the general type referred to are usually provided with interlocking formations extending entirely along both opposed edges of a pipe section, whereby the edges of the pipe section may be brought together and locked throughout their entire length by engagement of the interlocking formations.

As above pointed out it is frequently quite difficult if not impossible to unlock and open such lock joints so that at best it would be a tedious and lengthy operation to knock down or disassemble any considerable amount of pipe provided with such lock joints.

A common disadvantage in lock joints of the general type referred to is that when the tapered or reduced end of one pipe section is inserted into the larger end of a similar pipe section, with the lock joints of the two pipe sections radially abutting each other, there is a tendency for the lock joint at the reduced or tapered end of each pipe section to be forced toward open position by inward pressure of the lock joint at the larger end of the adjacent pipe section, and also the outward pressure of the lock joint in the tapered or reduced end of each pipe section will tend to force apart the locking formations upon the larger end of an adjacent pipe section into which the tapered or reduced end is inserted.

A further disadvantage in the use of such lock joints is that when the tapered or reduced end of a pipe section is inserted into the larger end of a similar pipe section, owing to the thickness of the lock joints of the two pipe sections which radially abut each other, there is a considerable space between the walls of the telescoping pipe sections on each side of the lock joint. This is undesirable as it permits moisture, smoke, soot and dust to pass through these openings from the interior of one pipe section to the exterior of the adjacent pipe section. There is also the possibility of the draft being diminished by the admission of air from the room, through these openings, to the interior of the pipe.

The present invention contemplates the provision of a lock joint of the general character referred to, which will securely hold the pipe in locked position but which is so constructed as to permit the lock joint to be easily and readily opened.

The instant application also contemplates certain improvements upon the lock joint disclosed in said co-pending application whereby the joint may be more readily and easily unlocked and opened when desired.

Another object is to provide such a lock joint for pipes in which the locking formations upon opposed edges of the pipe section are interrupted at intervals throughout the length of the pipe.

A further object is to provide such a lock joint in which the locking formations upon opposed edges of the pipe may be easily disengaged by relative longitudinal sliding movement of the opposed edges of the pipe section in opposite directions.

A still further object is to provide a lock joint for sheet metal pipes which is so constructed that adjacent ends of two similar pipe sections will fit tightly together throughout their entire circumference, thus eliminating any undesirable openings on opposite sides of the lock joint, as well as eliminating the possibility of the abutting lock joints of the adjacent pipe section exerting outward or inward pressure upon either pipe section which might tend to open the joint at this point.

It is also an object to provide such a lock joint in which the interlocking formations at opposed edges of the pipe section are located entirely on the exterior of the pipe, at the upper or larger end thereof, and entirely within the pipe at the lower or reduced end thereof.

A further object is to provide a sheet metal pipe having an open pocket formation at one edge and a tongue formation upon the other edge adapted to be received into said pocket, the tongue and pocket having interlocking formations thereon at spaced intervals only throughout the length of the pipe for securely holding the pipe in closed position.

A still further object of the invention is to provide such a lock joint in which spaced recesses are formed in the pipe adjacent to the tongue formation to receive the raw edge of the tongue in order to provide a substantially smooth contour over which the locking shoulder of the pocket formation may easily ride in unlocking the joint.

The above objects together with others which will be apparent from the drawings and following description, or which may be later referred to, may be attained by constructing the improved lock joint for sheet metal pipe in the manner hereinafter described in detail and illustrated in the accompanying drawings, in which:

Fig. 1 is a perspective view of a stove pipe section having locking formations thereon embodying the invention, showing the lock joint in the closed or locked position;

Fig. 2 a perspective view of the pipe section showing the manner in which the interlocked edges of the pipe may be slidably moved longitudinally in opposite directions to unlock the joint;

Fig. 3 a perspective view of the pipe section showing the joint in the unlocked or open position;

Fig. 4 a side elevation of the pipe showing the manner in which the interlocking formations are inclined so as to be located upon the exterior of the larger end of the pipe and on the interior of the reduced or crimped end thereof;

Fig. 5 a longitudinal section through the tongue edge of the pipe, taken on the line 5—5, Fig. 3;

Fig. 6 a similar section through the pocket edge of the pipe, taken on the line 6—6, Fig. 3;

Fig. 7 an enlarged, fragmentary, transverse section through the interlocking formations in open position, taken as on the line 7—7, Fig. 3;

Fig. 8 a similar section through the intermediate pocket and tongue formations in open position, taken as on the line 8—8, Fig. 3.

Fig. 9 an enlarged, fragmentary, transverse section through the locking formations at the larger end of the pipe in closed position, taken as on the line 9—9, Figs. 1 and 4;

Fig. 10 a similar section through one of the intermediate portions of the pocket and tongue formations, in closed position, taken as on the line 10—10, Figs. 1 and 4;

Fig. 11 a section similar to Fig. 9, at the reduced end of the pipe; and,

Fig. 12 a similar section through adjacent ends of two telescoping pipe sections provided with the improved interlocking formations.

Referring now more particularly to the construction illustrated in which similar numerals refer to similar parts throughout, a section of stove pipe provided with interlocking formations embodying the invention is indicated generally at 15.

Although, as above mentioned, the present invention is applicable to any lock joint of the general type referred to, having locking formations upon opposed edges, for the purpose of illustration only the invention is shown as applied to a pipe section provided with a lock joint such as shown in U. S. patents to J. A. Krantz No. 1,900,750 and A. C. Sladky No. 1,900,749, dated March 7, 1933.

This pipe section may be cylindrical throughout the greater portion of its length as shown in the drawings, or it may be oval, square, rectangular or of other cross-sectional shape, and while illustrated as applied to a conventional type of stove pipe, it should be remembered that the invention is also applicable to any other form of sheet metal pipe such as furnace pipes, ducts, conductor pipes and the like.

As in conventional practice, one end of the pipe may be crimped or corrugated, as indicated at 16, in order to taper or reduce the same sufficiently so that it may be telescoped within the other or larger end 17 of a similar pipe. The pipe may also be provided with the usual annular bead 18 to limit the extent to which the smaller end thereof may be telescoped within the larger end of a similar pipe.

The lock joint illustrated comprises interlocking tongue and pocket formations formed upon opposed edges of the pipe, one edge being provided throughout its length with a tongue formation which may be formed by bending the metal inwardly as at 19, then forwardly as at 20, and then rearwardly upon itself as at 21, forming a folded tongue which terminates in the raw edge 22 extending rearwardly of the inwardly bent portion 19.

The opposite edge of the pipe section is provided with a pocket formation adapted to receive the tongue 20—21, and may be formed by folding the metal inwardly from the periphery of the pipe and back upon itself as shown at 23, upon the interior of the pipe section, the metal then being folded in the reverse direction, as indicated at 24 and spaced from and preferably substantially parallel with, the portion 23, forming the pocket 25 therebetween.

The reversely folded portion 24 of the metal extends some distance beyond the mouth of the pocket 25, and is then bent rearwardly and outwardly at an angle to form the angular locking shoulder 27, at a point spaced from the folded edge 28, and may terminate in the rearwardly disposed guide flange 29.

In the conventional lock joint of this general type now in common use, these locking formations extend throughout the entire length of the pipe, so that when the opposed edges are brought together and the tongue 20—21 is inserted into the pocket 25, the rearwardly disposed raw edge 22 of the tongue interlocks with the angular locking shoulder 27 of the pocket formation.

The present invention consists in so deforming the tongue and pocket formations at spaced intervals, that the locking formations will be intermittently interrupted throughout the length of the pipe.

As shown in Figs. 5, 8 and 10 the tongue formation may be thus deformed at these points by bending the rear or inner end of the flange 21 outward as indicated at 30, substantially into contact with the inner surface of the pipe at these points.

In order to provide a smooth contour over which the locking shoulders 27 may slide easily, when the interlocked edges of the pipe are slidably moved longitudinally relative to each other, as in Fig. 2, to unlock the joint, spaced recesses 31 are formed in the tongue edge of the pipe to receive the terminal edges of the deformed portions 30 of the tongue flange 21.

The raw edges 22 of these deformed portions 30 of the tongue flange 21 are thus located in the recesses 31, as shown in Figs. 5, 8 and 10, so that these raw edges do not form any obstruction to the locking shoulders 27 when it is desired to unlock or open the joint.

The pocket section is deformed to eliminate the angular locking shoulder 27 by bending the edge portion of the sheet angularly outward as indicated at 32. Thus, when the edge formations are brought together, as shown in Fig. 10, there will be no inter-locking at these points throughout the same, while the intermittent locking formations at each end, and at spaced points throughout the length of the joint, will hold the pipe in locked position, as shown in Figs. 9, 11 and 12.

To close the joint and lock the edges of the pipe section together, the folded tongue 20—21 is guided upon the flange 29 and inserted into the pocket 25 of the opposite formation and the edges of the pipe section are pressed together until the tongue formation snaps into place within the pocket formation.

The raw edges 22 of the tongue formation are received at intervals within the crotches or angles of the locking shoulders 27, at each end and at spaced points throughout the length of the pipe, as shown in Figs. 9, 11 and 12.

At the spaced intermediate points in the pipe where the locking shoulder is flattened as at 32, and the terminal flange 21 of the tongue formation is bent outwardly as at 30, the tongue is merely received within the pocket and not interlocked therewith, as best shown in Fig. 10.

While these spaced locking formations throughout the length of the pipe will hold the pipe tightly locked, producing a straight, uniform seam throughout the length of the pipe, as indicated at 33 in Fig. 1, this arrangement of interrupted locking formations permits the pipe to be easily unlocked and opened by slidably moving the two opposed edges of the pipe longitudinally in opposite directions, as indicated in Fig. 2, until all of the rearwardly disposed raw edges 22 of the tongue formation are disengaged from the angular locking shoulders 27 of the pocket formation, permitting the pipe to open to the position shown in Fig. 3.

With this construction of interrupted locking formations, the pipe is held securely locked when in use and cannot be accidentally unlocked, while, at the same time, when it is desired to disassemble or knock down the pipe to transport it to a different location for use, each section of the pipe may be quickly and easily unlocked and opened so that a plurality of the pipe sections may be nested together for transportation to another location where they may be again assembled for use.

The invention further consists in slightly inclining the locking formations from one end of the pipe to the other, as best shown in Fig. 4, so that the entire lock joint is located upon the exterior of the pipe at the larger end 17 thereof, as indicated at 35, while the entire lock joint is located upon the interior of the pipe at the reduced end 16 thereof as indicated at 36 in Figs. 11 and 12.

With this construction, as best shown in Fig. 12, when the reduced end 16 of a pipe formed with this lock joint is inserted into the larger end 17 of a similar pipe section, the two pipe sections will fit tightly together so that there will be no openings at either side of the lock joint through which moisture, soot, dust, smoke or air may pass, and there is no outward or inward pressure upon either lock joint which might tend to force the same open.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described therein are by way of example, and the scope of the present invention is not limited to the exact details disclosed.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A pipe section comprising an imperforate metallic sheet having a tongue formation along one edge and a pocket formation along the other edge, said pocket formation terminating beyond the mouth of the pocket in a forwardly disposed flange forming a guide for the tongue formation, said forwardly disposed flange being bent rearwardly and outwardly at spaced points forming spaced angular locking shoulders, the intermediate portions of said forwardly disposed flange being inclined forwardly and outwardly, a rearwardly disposed flange upon the tongue formation having spaced portions thereof forming spaced interlocking formations for locking engagement with said spaced angular locking shoulders only, the intervening portions of said rearwardly disposed flange being inclined outwardly, spaced outwardly disposed recesses in the tongue formation, the terminal edges of said intervening outwardly inclined portions of said rearwardly disposed flange being located in said recesses, whereby insertion of the tongue formation into the pocket formation will cause the spaced interlocking formations upon the tongue to interlock with the spaced angular locking shoulders upon the pocket formation only, and whereby said spaced interlocking formations may be disengaged from said spaced angular locking shoulders by relative longitudinal movement of said edges in opposite directions.

2. A pipe section comprising an imperforate metallic sheet having a tongue formation along one edge and a pocket formation along the other edge, said pocket formation terminating beyond the mouth of the pocket in a forwardly disposed flange forming a guide for the tongue formation, said forwardly disposed flange being bent rearwardly and outwardly at spaced points forming spaced angular locking shoulders, the intermediate portions of said forwardly disposed flange being inclined forwardly and outwardly, a rearwardly disposed flange upon the tongue formation having spaced portions thereof forming spaced interlocking formations for locking engagement with said spaced angular locking shoulders only, the intervening portions of said rearwardly disposed flange being inclined outwardly, spaced outwardly disposed recesses in the tongue formation, the terminal edges of said intervening outwardly inclined portions of said rearwardly disposed flange being located in said recesses, whereby insertion of the tongue formation into the pocket formation will cause the spaced interlocking formations upon the tongue to interlock with the spaced angular locking shoulders upon the pocket formation only, and whereby said spaced interlocking formations may be disengaged from said spaced angular locking shoulders by relative longitudinal movement of said edges in opposite directions, said pocket and tongue formations being inclined longitudinally from one end of the pipe to the other end thereof so that said formations are located upon the exterior of one end of the pipe and upon the interior of the opposite end of the pipe.

3. A pipe comprising an imperforate metallic sheet having a pocket formation along one edge and a tongue formation along the other edge for insertion into the pocket, outwardly angled locking shoulders upon the pocket formation at equally spaced points only throughout the length of the pipe, a rearwardly disposed flange upon the tongue formation having spaced portions thereof forming spaced interlocking formations for locking engagement with said spaced angular locking shoulders only, the intervening portions of said rearwardly disposed flange being inclined outwardly, spaced outwardly disposed recesses in the tongue formation, the terminal edges of said intervening outwardly inclined portions of said rearwardly disposed flange being located in said recesses, whereby insertion of the tongue formation into the pocket formation will cause the spaced interlocking formations upon the tongues to interlock with the spaced angular locking shoulders upon the pocket formation only, and whereby said spaced interlocking formations may be disengaged from said spaced angular locking shoulders by relative longitudinal movement of said edges in opposite directions.

4. A pipe comprising an imperforate metallic sheet having a pocket formation along one edge and a tongue formation along the other edge for insertion into the pocket, outwardly angled locking shoulders upon the pocket formation at equally spaced points only throughout the length of the pipe, a rearwardly disposed flange upon the tongue formation having spaced portions thereof forming spaced interlocking formations for locking engagement with said spaced angular locking shoulders only, the intervening portions of said rearwardly disposed flange being inclined outwardly, spaced outwardly disposed recesses in the tongue formation, the terminal edges of said intervening outwardly inclined portions of said rearwardly disposed flange being located in said recesses, whereby insertion of the tongue formation into the pocket formation will cause the spaced interlocking formations upon the tongues to interlock with the spaced angular locking shoulders upon the pocket formation only, and whereby said spaced interlocking formations may be disengaged from said spaced angular locking shoulders by relative longitudinal movement of said edges in opposite directions, said pocket and tongue formations being inclined longitudinally from one end of the pipe to the other end thereof so that said formations are located upon the exterior of one end of the pipe and upon the interior of the opposite end of the pipe.

5. A pipe comprising an imperforate metallic sheet having a pocket formation along one edge and a tongue formation along the other edge for insertion into the pocket, outwardly angled locking shoulders upon the pocket formation at equally spaced points only throughout the length of the pipe, a rearwardly disposed flange upon the tongue formation having spaced portions thereof forming spaced interlocking formations for locking engagement with said spaced angular locking shoulders only, the intervening portions of said rearwardly disposed flange being inclined outwardly, spaced outwardly disposed recesses in the tongue formation, the terminal edges of said intervening outwardly inclined portions of said rearwardly disposed flange being located in said recesses, whereby insertion of the tongue formation into the pocket formation will cause the spaced interlocking formations upon the tongues to interlock with the spaced angular locking shoulders upon the pocket formation only, and whereby said spaced interlocking formations may be disengaged from said spaced angular locking shoulders by relative longitudinal movement of said edges in opposite directions, one end of said pipe being slightly reduced in diameter, said pocket and tongue formations being inclined longitudinally from the other end of the pipe to said reduced end thereof so that said formations are located upon the exterior of said other end of the pipe and upon the interior of said reduced end.

References Cited in the file of this patent

UNITED STATES PATENTS

| | | |
|---|---|---|
| 632,852 | Smith | Sept. 12, 1899 |
| 1,705,620 | Kielberg | Mar. 19, 1929 |
| 1,900,750 | Krantz | Mar. 7, 1933 |
| 2,042,883 | Delaney | June 2, 1936 |
| 2,634,761 | Gray | Apr. 14, 1953 |
| 2,703,110 | Curtis | Mar. 1, 1955 |